(12) United States Patent
Bumbarger et al.

(10) Patent No.: US 6,371,977 B1
(45) Date of Patent: Apr. 16, 2002

(54) PROTECTIVE MULTI-LAYERED LIQUID RETAINING COMPOSITE

(75) Inventors: Scott A. Bumbarger; Thomas H. Bumbarger, both of Decatur, AL (US)

(73) Assignee: Aquatex Industries, Inc., Decatur, AL (US)

(*) Notice: Subject to any disclaimer, the term of this patent is extended or adjusted under 35 U.S.C. 154(b) by 0 days.

(21) Appl. No.: 09/408,861

(22) Filed: Sep. 30, 1999

Related U.S. Application Data

(63) Continuation-in-part of application No. 09/275,194, filed on Mar. 23, 1999, which is a continuation-in-part of application No. 08/947,184, filed on Oct. 8, 1997, now Pat. No. 5,885,912.

(51) Int. Cl.[7] .............................. A61F 7/00; A41D 1/04
(52) U.S. Cl. ....................... 607/108; 607/112; 607/96; 2/102; 428/372
(58) Field of Search ........................ 607/96, 108–112, 607/114; 604/358, 361; 602/41, 56

(56) References Cited

U.S. PATENT DOCUMENTS

| | | | |
|---|---|---|---|
| 3,670,731 A | | 6/1972 | Harmon |
| 4,252,119 A | * | 2/1981 | Coates |
| 4,304,817 A | | 12/1981 | Frankosky |
| 4,433,024 A | | 2/1984 | Eian |
| 4,562,114 A | * | 12/1985 | Sawanishi et al. .......... 428/372 |
| 4,818,599 A | | 4/1989 | Marcus |
| 4,855,179 A | | 8/1989 | Bourland et al. |
| 4,873,143 A | * | 10/1989 | Tanaka .................. 428/373 |
| 4,897,297 A | * | 1/1990 | Zafiroglu ................ 428/102 |
| 4,957,795 A | | 9/1990 | Riedel |
| 5,043,209 A | | 8/1991 | Boisse et al. |
| 5,087,513 A | * | 2/1992 | Kim ..................... 428/283 |
| 5,104,725 A | | 4/1992 | Broaddus |
| 5,350,370 A | | 9/1994 | Jackson et al. |
| 5,389,442 A | | 2/1995 | Arroyo et al. |
| 5,413,747 A | | 5/1995 | Akers et al. |
| 5,419,955 A | | 5/1995 | Ehrhardt et al. |
| 5,466,513 A | * | 11/1995 | Wanek et al. ............. 428/218 |
| 5,539,928 A | | 7/1996 | Aldridge |
| 5,640,718 A | | 6/1997 | Aldridge |
| 5,681,300 A | | 10/1997 | Ahr et al. |
| 5,724,673 A | | 3/1998 | Aldridge |
| 5,755,110 A | * | 5/1998 | Silvas .................... 62/259.3 |
| 5,819,316 A | | 10/1998 | Aldridge |
| 5,885,912 A | | 3/1999 | Bumbarger |
| 5,906,952 A | | 5/1999 | Everaere et al. |
| 5,920,905 A | | 7/1999 | Aldridge |
| 5,933,865 A | * | 8/1999 | Aldridge ................. 2/81 |
| 5,939,339 A | | 8/1999 | Delmore et al. |

FOREIGN PATENT DOCUMENTS

EP  0 436 514  1/1991

* cited by examiner

*Primary Examiner*—Roy Gibson
(74) *Attorney, Agent, or Firm*—Waddey & Patterson, PC; Richard S. Myers, Jr.

(57) ABSTRACT

A multi-layered composite comprising a protective layer, a retaining layer, a conductive layer and a filler layer intermediate the retainer and conductive layers. The filler layer is impregnated with liquid absorbent particles and/or fibers. An optional protective layer having specific characteristic for protection against extreme temperatures, physical impacts and the like is specifically disclosed for use in combination with the retainer, filler and conductive layers. The protective layer provides additional protection of the person from catastrophic events such as exposure of a person to fire and/or severe impact such as may be caused by gunfire.

35 Claims, 10 Drawing Sheets

PROTECTIVE MULTI-LAYERED LIQUID RETAINING COMPOSITE

CROSS REFERENCE TO RELATED APPLICATIONS

This application is a continuation-in-part application of Ser. No. 09/275,194, A PROTECTIVE MULTI-LAYERED LIQUID RETAINING COMPOSITE filed Mar. 23, 1999 by Bumbarger et al., which is a continuation-in-part of patent application Ser. No. 08/947,184 filed Oct. 8, 1997, now U.S. Pat. No. 5,885,912, issued Mar. 23, 1999, both of which are incorporated herein by reference.

FIELD OF THE INVENTION

This invention relates generally to fluid retaining materials, and particularly to a fibrous polymeric blend and a multi-layered composite material comprising the fibrous blend suitable for fabrication of a wide variety of items such as protective garments, blankets, compresses, etc. A filler layer impregnated with liquid absorbent particles, fibers, or blends thereof is positioned between layers of selected fabrics. The composite, after being soaked in a liquid, provides covering which protects and/or provides comfort. The present invention also protects from extreme heat or cold as well as from physical injury resulting from impact. Additionally, the invention may be utilized to control body temperature of a person by providing warmth or cooling, as may be needed.

BACKGROUND OF THE INVENTION

Many inventions appear in the prior art that relate to composites and/or garments for the comfort and/or protection of a person's body. These inventions relate to heating or cooling of a person's body; keeping the body wet or dry; protection of the body from conditions of extreme heat or cold, as well as protection of the body from impact from high speed objects. The use of liquid absorbent composites has been utilized in many ways to aid in the effectiveness of such composites and garments. Examples of U.S. patents relating in one way or another to this art are as follows: U.S. Pat. Nos. 2,855,758; 3,429,138; 3,670,731; 3,971,373; 4,105,033; 4,133,055; 4,235,227; 4,429,001; 4,556,055; 5,113,666; 5,289,695; 5,328,759; 5,419,955; and 5,480,410; each of which are incorporated herein by reference.

The grandparent case to this application (U.S. Pat. No. 5,885,912), disclosed certain types of garments constructed in accordance with the embodiments of composite materials disclosed therein. More specifically, pockets or quilting having seams were sewn into a garment, and were filled with a combination of batting and microcrystals of hydrophilic polymers.

The parent case to this application disclosed a composite material having an additional embodiment comprising a hydrophilic polymeric fiber and batting or fiberfill material.

SUMMARY OF THE INVENTION

This invention provides combination of fiberfill batting material and superabsorbant hydrophilic polymeric particles, fibers, or blends thereof. Additionally, this invention provides a multi-layered, liquid retaining composite material having on one side a conductive layer provided with a coating impervious to fluids while allowing free passage of gasses therethrough. A filler layer having superabsorbant properties is disposed adjacent this conductive layer, with a retainer layer contacting the filler layer. This invention further relates to methods of using the fibrous combination and composite to heat or cool a human.

BRIEF DESCRIPTION OF THE DRAWINGS

Reference is now made to the accompanying drawings, which forms a part of the specification of the present invention.

DETAILED DESCRIPTION OF THE INVENTION

Figure 1:
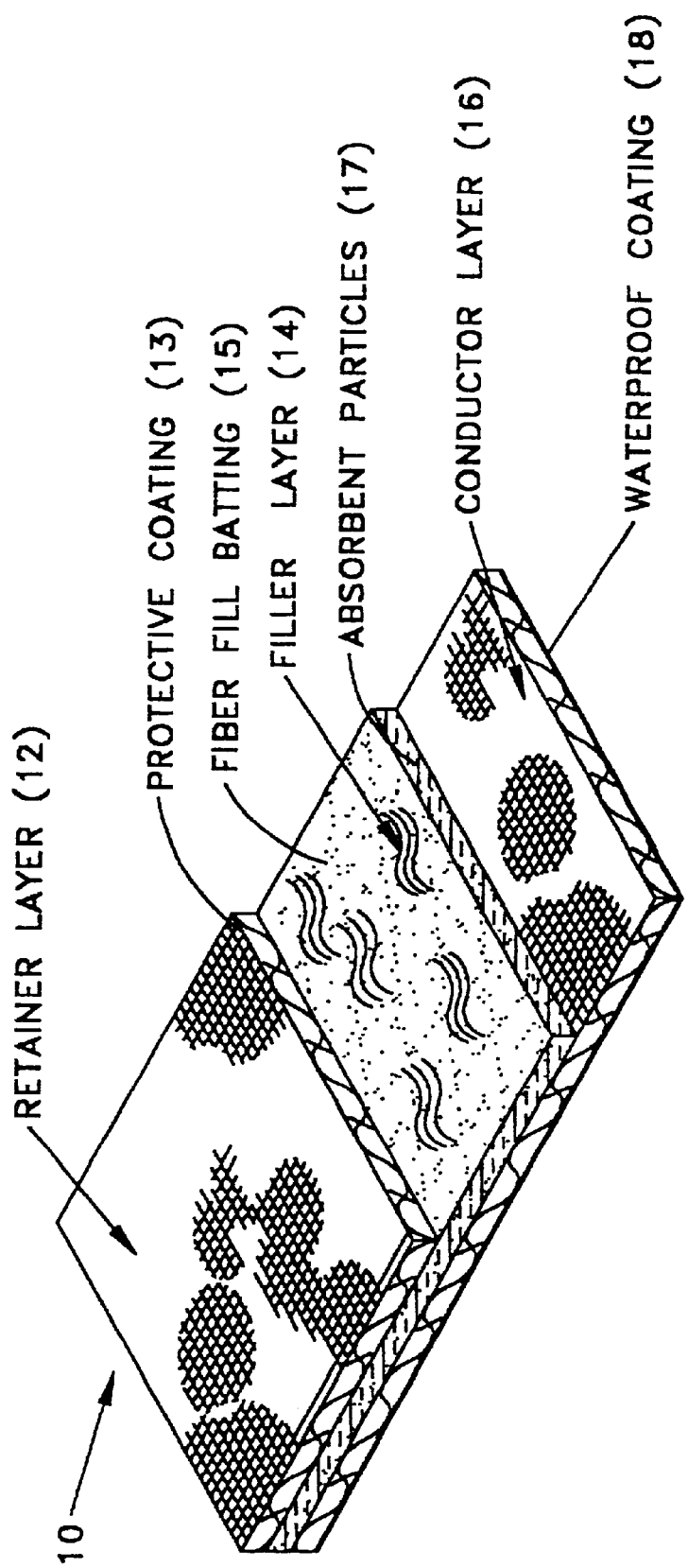
FIG. 1: a perspective view of one embodiment of a multi-layered composite wherein sections of discrete layers and coatings are illustrated.

The present invention addresses thermal and impact protection, as well as certain medical conditions, by providing unique and versatile blends of superabsorbant polymeric particles, fibers, or blends thereof. This blend may be used in connection with another aspect of the present invention, a multi-layered composite material from which protective garments, compresses, blankets, etc. may be constructed. The composite is also well suited for fabrication of protective items for cooling or heating the body and for protecting the body from intense heat or cold, as well as from physical injury.

Thus, another embodiment of the present invention is a method of protecting the human body from heat or cold comprising applying the polymeric blend of the present invention to a human preferably by means of one of the garments discussed above. Furthermore, another embodiment is providing a method of heating or cooling the body by applying the polymeric blend disclosed herein.

Additionally, garments made from the multi-layered composite are extremely effective for use by firemen, law enforcement officers, military personnel and persons such as foundry or bakery workers who are exposed for long periods of time to high temperatures. The garments, particularly blankets, may also be effective for treating persons that have been exposed to extremely low temperatures and are suffering from hypothermia. Conversely, where a person is suffering from a high fever, such a blanket soaked in a cold liquid provides means for emergency treatment of fever. In this use, a liquid more volatile than water, such as alcohol, may be used to more effectively promote cooling. More significantly, such blankets may also provide protection from fire and impact from projectiles or projectile-like objects. Additionally, garments and blankets fabricated from the composite material of the invention may be used to reduce thermal signatures for military operations. Catastrophes such as windstorms, fire, and war often occur wherein people are provided some warning but time does not permit evacuation of bed ridden patients from hospitals or homes for the elderly. Liquid-soaked blankets fabricated from the composite of the present invention will provide effective protection against burns or impact injuries for such persons.

In general terms, the invention includes a basic configuration of a multi-layered, liquid-retaining composite material comprising of:

a conductive layer which is adapted for placement in close proximity to, or indirect contact with the body of the wearer;

a filler layer impregnated a fiberfill batting material and with liquid absorbent particles, fibers, or a combination of both;

a retainer layer for retention of the filler layer between the conductive layer and the retention layer; and, if needed, an outside protective layer attached to, or placed adjacent to, the outermost surface of the retention layer.

With respect to the liquid absorbent fibers, the blend is a combination of a superabsorbant polymeric fiber and fiberfill or batting. The particular fiberfill is not known to be critical. That is, any commercial fiberfill may be used as long as it does not adversely affect the performance of the end composite. Accordingly, when the end composite is to be used as or part of a fire retardant garment, the fiberfill or batting is chosen accordingly. In such a case, the fiberfill is typically comprised of a flame and heat resistant material such as woven aramid and/or polybenzamidazole ("PBI") fibers. That is, the fiberfill is selected from a group consisting of an aramid polymer fabric material, as blend of aramid polymer fabric materials, a polybenzamidazole material, and a blend of aramid polymer fabric and polybenzamidazole materials. For other non-flame retardant applications, commercial fiberfill such as DuPont DACRON® available from DuPont, or polyester fiberfill products from Consolidated Textiles, Inc. of Charlotte, N.C. Additionally, U.S. Pat. Nos. 5,104,725; 4,304,817; and 4,818,599; all of which hare incorporated by reference, disclose fiberfill fibers and blends suitable for certain applications of the present invention.

Regarding the extruded hydrophilic fiber discussed above, it is preferable that the hydrophilic fibers absorb at least approximately 2.5 to 3 times their weight in water in a manner similar to the polymeric particles discussed herein. As discussed below, a preferred fiber is a polyacrylonitrile/polyacrylate hydrophilic fiber similar to a LANSEAL-F-type material. The hydrophilic fiber of the present invention may also be one of the superabsorbent fibers disclosed in U.S. Pat. No. 5,350,370, incorporated herein by reference. Typically these fibers will have diameters ranging from about 10 to 50 microns and lengths ranging from about 3 to 60 millimeters. Their absorbency will typically range between about 10 and about 40 grams per gram of superabsorbent under a load of 0.5 pounds per square inch (3500 pascals) using 0.9% by weight saline solution. Commercially available superabsorbent fibers include Allied Colloids/Courtalds FSA.RTM. 101 and 111; ARCO FIBERSORB.RTM. from Arco Corporation of Philadelphia, Pa.; and TOYO BOSEKI KK Lanseal from Toyo Boseki KK of Osaka, Japan.

Additionally, the fibers of the present invention may be a superabsorbant fiber of U.S. Pat. No. 5,906,952, incorporated herein by reference. Thus, the hydrophilic fibers of the present invention may be a cross-linked acrylate copolymer, partially neutralized to the sodium salt (according to U.S. Pat. Nos. 5,413,747 and 5,466,731) and available in fiber form under the trade name OASIS from Technical Absorbents Limited of Grimsby, United Kingdom; or olefin/alkyl carboxylate co-polymer, partially neutralized to the sodium salt (according to E.P. 0 436 514 81) and available in fiber form under the trade name CAMELOT from Camelot Super Absorbents Ltd. of Calgary, Canada). The superabsorbent fibers of U.S. Pat. No. '952 are preferably less than 10 denier (optimally 3–10 denier) with a cut length of 30–65 millimeters (optimally 50 mm). Denier is the unit weight of a fiber expressed as the weight in grams of a 9,000 meter length.

Finally, in another embodiment of the present invention, the hydrophilic fibers of the present invention may be the high-speed absorbent fibrous gelling materials disclosed in U.S. Pat. No. 5,681,300, incorporated herein by reference. Such fibers (though not necessarily high-speed fibrous absorbent gelling materials) are discussed more fully in U.S. Pat. No. 4,855,179, issued Aug. 8, 1989, to Bourland, et al. The term "fibrous absorbent gelling materials", as used herein, is intended to include absorbent gelling materials in the form of fibers that are comprised entirely of absorbent gelling material and bi-component fibers that are comprised at least partially of other materials which have their surfaces coated with absorbent gelling materials. Suitable fibrous absorbent gelling materials include an acrylic fibrous material available under the trade name Lanseal-F, a preferred embodiment of the present invention, and a carboxymethylcellulose fibrous material available under the trade name Aqualon C from Hercules, Inc. Suitable high speed fibrous absorbent gelling materials are known as FIBERSORB SA7000 or SA7200 formerly manufactured by Arco Chemical Company of Newton Square, Pa.

In a preferred embodiment, the fibers of the present invention are a bi-component fibers of the sheath-core type with the outer layer being made of cross-linked acrylate copolymer, partially neutralized to the ammonium salt and the inner layer being made of polyacrylonitrile. Such fibers are disclosed in U.S. Pat. No. 4,562,114 incorporated herein by reference.

The fibers of the preferred embodiment of the present invention are thus water-absorbing acrylic fibers which have a stable water-absorbing ability that will not be readily lowered by heat treatment, etc. and which are excellent in physical properties such as strength and elongation and in practical properties such as color fastness, spinnability, etc.

The water-absorbing fibers of this embodiment are composed of not less than 90 weight % of polymer of acrylonitrile (hereinafter abbreviated as AN) and less than 10 weight % of a water-absorbing resin containing carboxyl groups (represented by —COOX wherein X is H, $NH_4$ or an alkali-metal) and having a degree of water swellability of 10–300 cc/g, the particle diameter of which resin is not larger than 0.5 microns at absolute dryness, the carboxyl groups of the water-absorbing resin present at least in the outer layer of the fibers being acid type (—COOH), the inner layer of the fibers having pores not smaller than 0.2 microns in their largest diameter, and the water-holding ratio of said fibers being not less than 20%.

The fibers of this embodiment are made according to the procedures set forth in U.S. Pat. No. '114. Regarding the above described AN polymers of the present invention, any of those used in the production of acrylic fibers known heretofore may be used, and no limitation is placed on the polymer. However, it is preferable to use a copolymer of not less than 80 weight %, preferably not less than 90 weight %, of AN and the remainder of another vinyl monomer, from a viewpoint of fiber physical properties, dyeability, etc. Also, any water-absorbing resin may be employed as long as they contain carboxyl groups (represented by —COOX wherein X is H, $NH_4$ or an alkali-metal) in an amount of preferably not less than 1.5 m mol/g, more preferably not less than 3.0 m mol/g, have a degree of water-swellability of 10–300 cc/g, preferably 20–150 cc/g and a particle diameter not larger than 0.5 microns, preferably not larger than 0.2 microns, and are insoluble in water and AN polymer solvents.

When a cross-linked AN copolymer having a particle diameter not larger than 0.5 microns, preferably not larger than 0.2 microns, which is composed of preferably not less than 50 weight %, more preferably not less than 70 weight %, of AN, based on the total amount of the monomers composing the polymer, and definite amounts of a crosslinking monomer and another vinyl monomer copolymerizable with AN, or an aqueous dispersion of such a crosslinked AN copolymer, is reacted, in the usual way, with an alkaline substance so as to introduce carboxyl groups into said copolymer, it is possible to produce, in an industrially advantageous manner, a resin having a degree of water-swellability of 10–300 cc/g, preferably 20–150 cc/g or an aqueous dispersion of said resin.

The water-absorbing acrylic fibers according to this embodiment produced in the above way should contain preferably not less than 5 pores having longer diameter not shorter than 0.2 microns in the fiber inner layer, and have a water-holding ratio not less than 20%, preferably not less than 25%.

In addition, the fibers according to this embodiment have a decrease in the water-holding ratio, after dry-heat treatment at 120° C. for one hour, of not more than 10%, preferably not more than 5%, so that in supplementary processing steps or in practical use, there is no substantial lowering in the water-absorbing capacity.

In summary, water-absorbing acrylic fibers the preferred embodiment preferably have an outer and an inner layer and being composed of not less than 90 weight % of an acrylonitrile polymer and having dispersed therein less than 10 weight % of water-absorbing resin particles containing carboxyl groups, represented by —COOX wherein X is H, $NH_4$ or an alkali metal. The resin preferably has substantially no water-swellability when X is H and has a degree of water-swellability of 10–300 cc/g when X is $NH_4$ or an alkali metal. The particle diameter of the resin is preferably not larger than 0.5 microns at absolute dryness, and the particles of the water-absorbing resin are present at least in the outer layer of the fibers having carboxyl groups wherein X is H. The particles of the water-absorbing resin present in the inner layer having the carboxyl groups wherein X=$NH_4$ or alkali metal are present in an amount sufficient to render the fiber water-absorbing, a cross-section of the fibers containing not less than 5 pores no smaller than 0.2 microns in their maximum diameter and the fibers having a water-holding ratio not lower than 20%. The fibers having been obtained by wet-spinning a spinning solution composed of an acrylonitrile polymer the said water-absorbing resin particles, water-washing the resulting fibers, acid treating the fibers at a pH not higher than 4, subjecting the fibers to heat-stretching treatment and dry-compacting treatment, followed by wet-heat relaxing treatment at a temperature not lower than 110° C. and then drying the fibers at 105°–170° C., the water-absorbing resin being present at 0.5 to 7 wt. %.

Preferably, the hydrophilic polymeric fiber is blended with the fiberfill in a range of from about 15% to 75% with the fiberfill. The blend may be varied depending on the end use of the composite. For instance, a low about of polymeric fiber would result in a light composite that may be used for, for example, a shirt. A high amount of fiber would result in a heavy composite that may be used for, for example, a fireman's suit. Furthermore, the batting can be thickened depending on the use of the end product. For example, a batting with a thickness of 1/16 of an inch (before quilting) may be used as a shirt. A batting with a thickness of over an inch (before quilting), for example, may be used in conjunction with a bulletproof vest.

One of the advantages of the combination of the hydrophilic polymers and the fiberfill material is that the blend both promotes evaporation qualities and provides a means to hold cool or hold hot. That is, the blend retains coolness or warmth when chilled or heated. Hydrophilic blends of the present invention allow certain composites to be microwaved or refrigerated. In such a use, the batting helps act as an insulator to help maintain the desired temperature.

With respect to the liquid retaining composite material, the conductive layer may typically be formed of a water-resistant material that allows for moisture transmission. The filler layer may be formed of a fiberfill batting impregnated with liquid absorbent particles or a fibrous blend of fiberfill and superabsorptive. These particles are typically of the super-absorbent polymer type. The retainer layer is typically a fabric having a porosity which permits the passage of a liquid, such as water, but which is capable of retention of dry absorbent particles. The optional protective layer is typically configured to be fire and/or impact resistant.

When an application of the composite relates to protection of one's body from high temperatures, the multi-layered composite is soaked in a liquid, such as water, until the polymer particles and/or fibers reach the desired degree of saturation, typically a point equal to 50% to 90% of total saturation depending on the particular application. This range of saturation requires submersion in water for a period of about 2 to 5 minutes. When the blended composite material is used for impact protection, saturation degree may be as high as 100%. Where emergency situations require, provisions may be made for storage of garments, or other items fabricated from the composite, in devices which accelerate the required saturation. Such devices may include pressure vessels or tanks in which the temperature of the liquid is held at a temperature most conducive to rapid absorption by the polymer being used. If it is anticipated that sufficient time for soaking may not be available, the composite may also be stored in a pre-soaked condition. As will be more fully understood hereinafter, optimum saturation periods of the absorbent particles and/or fibers will be determined by the intended use, as well as the characteristics and quality of the composite.

For some applications, the multi-layered composite may be configured as a flat sheet. However, interconnection of the various layers by quilting seams provides more effective results for many uses, particularly with respect to impact protection. This quilting process forms pockets for retention of the absorbent particles and/or fibers, as will be further described. In other applications where synthetic fabrics or sheets are used, seams may be attached together by ultrasonic welding, bonding, application of heat, or any other suitable method. During use, and after being soaked in water for a predetermined period of time each absorbent particle typically expands 100 to 300 times its original volume and changes from a relatively hard, crystalline form to a squishy gelatinous mass. The polymeric fibers typically absorb about 2.5 to 3 times their weight. Because of the characteristics of the polymer particles or fibers, removal of the water from the polymer can only be accomplished by means of evaporation. Attempts to squeeze the water from the hydrated polymer will likely result in a breakdown of the structural integrity of the particle or fiber into smaller pieces that continue to retain the absorbed water. This characteristic provides an effective means for using the polymer mass as a shock absorbing substance.

As is well known, water by itself is considered to be incompressible. Water and many other liquids are used for shock absorbing purposes by encapsulation of the liquid in a container which is sealed except for a small opening that permits expulsion of the water at a controlled rate. To use water per se in such a manner in a fabric garment having numerous individual containers (pockets) would obviously be impractical because the water would leak out through the materials through which the water was admitted. However, by holding the water within a polymer, these properties of the water, when retained within the polymer, provide an effective shock-absorbing medium.

In this invention, a predetermined amount of water saturated polymer particles and/or fibers are encapsulated within a fabric pocket of a predetermined size. By controlling the amount of polymer in proportion to the size of the pocket, a positive pressure will be exerted upon the inner surfaces of the pocket by the expanding polymer particles and/or fibers as they are exposed to water. Thus, it will be readily understood that application of an external compression force to the pocket such as would be caused by an impact to the pocket, will decrease the volume the pocket. An increase of the internal pressure results as the volume of the pocket is reduced. If the polymer is totally saturated, and assuming the fabric to be waterproof, it will also be understood that after partial compression of the pocket, incompressibility of the water trapped within the polymer particles would cause the pocket to rupture if the force of compression became too great. While some of the energy of impact would he absorbed during this process, the abrupt rupture of the pocket would cause immediate loss of all resistance to the impact. To prevent such a rupture, a portion of the pocket fabric is of a porosity that will permit controlled expulsion or leakage of the hydrated polymer mass. The expulsion of the hydrated mass occurs as it is forced through the pores of the fabric at a rate sufficient to absorb energy, but to prevent rupture of the pocket.

This controlled expulsion of the hydrated polymer from the pocket provides an effective means of absorbing the energy created by the impact. As the saturated polymer is compressed and forced through the pores of the material, its structural integrity is rapidly transformed from a gelatin-like substance to a nearly liquefied emulsion. This rapid structural transformation requires the application of considerable force. As will become apparent, the application of energy from an impact will be more effectively absorbed if the force of the impact is distributed over a number of pockets. This distribution of impact force is accomplished by an optional outer protective layer that is fabricated having rigidity sufficient to effectively distribute the force in accordance with the severity of impact. Accordingly, a user of a multi-layered composite is provided with an effective protection from impact injuries. As the danger of extreme impacts is increased, such as with police involved with riot control or other hazardous duties, layers of more rigid materials are utilized to provide a means to distribute the energy of an impact to the largest possible number of pressurized pockets. When struck by a gunshot, the use of garments of this composite, which includes a ballistic protection layer, has proven to reduce the impact on the wearer by about 20%. It is also pointed out that segments of the protective layer of bulletproof or ballistic type materials may be placed over only the most vulnerable areas of the body. This arrangement provides the desired protection while greatly enhancing mobility of the user.

Tests of garments fabricated from this composite have been outstanding. As mentioned above, composite garments are readily adaptable to meet the requirements of a variety of applications. As an example, in a composite garment as described for use by a fireman, the retainer layer may simply be sprayed with a fire repellent coating, or if required, an additional or partial discrete layer of fire resistant material may be utilized.

It will be understood that after soaking a composite garment as described above, the composite provides an extremely effective protection for the wearer not only against extreme heat, but also against injury.

Referring now to the drawings, FIG. 1 illustrates one embodiment of the invention, and by way of example, a multi-layered composite 10 having a retainer layer 12, a filler layer 14 and a conductor layer 16. The retainer layer 12 may be a tightly woven high-strength fabric such as a NOMEX-type fabric through which a liquid (typically water) may pass. An optional protective coating 13 may be applied to the outer surface of the retainer layer 12. As the name implies, this coating protects the remainder of the composite against damage from external dangers such as fire and/or impact.

A variety of fire and impact resistant coatings suitable for this purpose are readily available; however provisions must be made to permit the passage of liquid either through or around the coating to facilitate hydration of the absorbent particles and/or fibers. This may be accomplished by piercing the coating with a multitude of minute punctures.

In one embodiment, filler layer 14 may be formed of a fiberfill-type batting 18, which is typically unaffected by the liquid utilized and which retains tiny absorbent particles 17 are distributed throughout the batting. The particles 17 typically may be a cross-linked polyacrylamide polymer, the absorption capacity of which being about 250 times. In additional embodiments of the present invention, the particles may be substituted for, or blended with hydrophilic fibers. The conductor layer 16 may, like the retainer layer 12, be made of a NOMEX-type fabric. The inner or outer surface, or possibly both surfaces, of conductor layer 16 (the surface which is in use directly against or in close proximity to a person's body) may be covered with a waterproof but breathable coating 18 such as "BREATHE TEX." The outer surface is shown being covered with this coating in FIG. 1. (It will be noted that hereinafter wherein reference is made to an inner or outer surface of layers in addition to the conductive layer, in each case the inner surface refers to the surface of the layer which is the closer to the conductive layer.) In use, this coating prevents liquid contained within the filler layer from coming in contact with the body of a user and also provides an effective thermal conductor which exposes the body of the user to the approximate temperature of the liquid retaining particles 17. Since the coating is breathable, it will permit the passage of moisture in vapor form the body of the user to the absorbent particles for absorption thereby. This, of course, assumes that the particles are not totally saturated. In most applications wherein the composite is to be used for body temperature control or protection from extreme external temperatures, the absorbent will be soaked to 50% to 70% of total saturation.

In a similar embodiment, the filler layer 14 may be constructed of a blend of fibrous materials, with one the fibrous materials being an extruded hydrophilic polymer. In this embodiment, the hydrophilic polymer may be a LANSEAL-F-type material, available from TOYOBO, of OSAKA, Japan, and which in its extruded form is a thread or fiber that may be blended in a range of from about 30% to about 60% with polyester fiberfill. The resulting blend of fibers is in appearance identical to fiberfill, with the hydrophilic polymer fibers absorbing approximately 2.5 to 3 times their weight in water in a similar manner as the liquid retaining particles 17.

Figure 2:
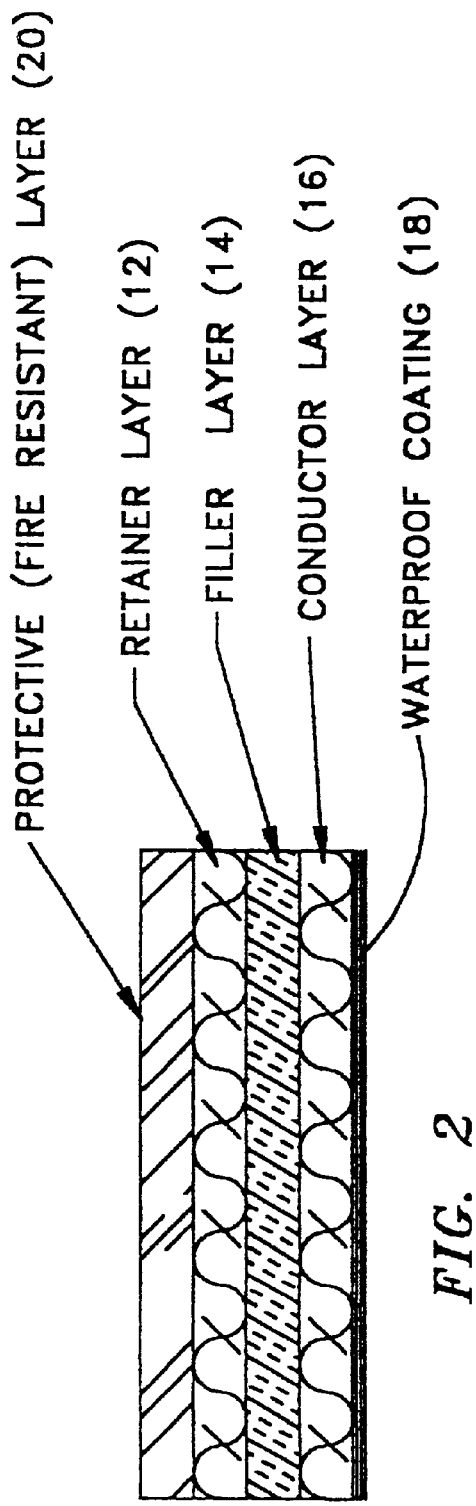
FIG. 2: a sectional elevation of an embodiment of a multi-layered composite wherein a fire resistant layer is included as a part of the composite.

The composite material illustrated by way of example in FIG. 2 includes an optional protective fire resistant layer 20. This discrete layer is utilized for applications wherein it is anticipated that the user will be subjected to fire or heat so extreme as to require the maximum possible thermal protection. Examples of such fire resistant materials include a NOMEX-type material and FR (fire resistant) cotton. As stated, the NOMEX-type material, suggested above as a basic retainer fabric, is a fire resistant material.

Figure 3:
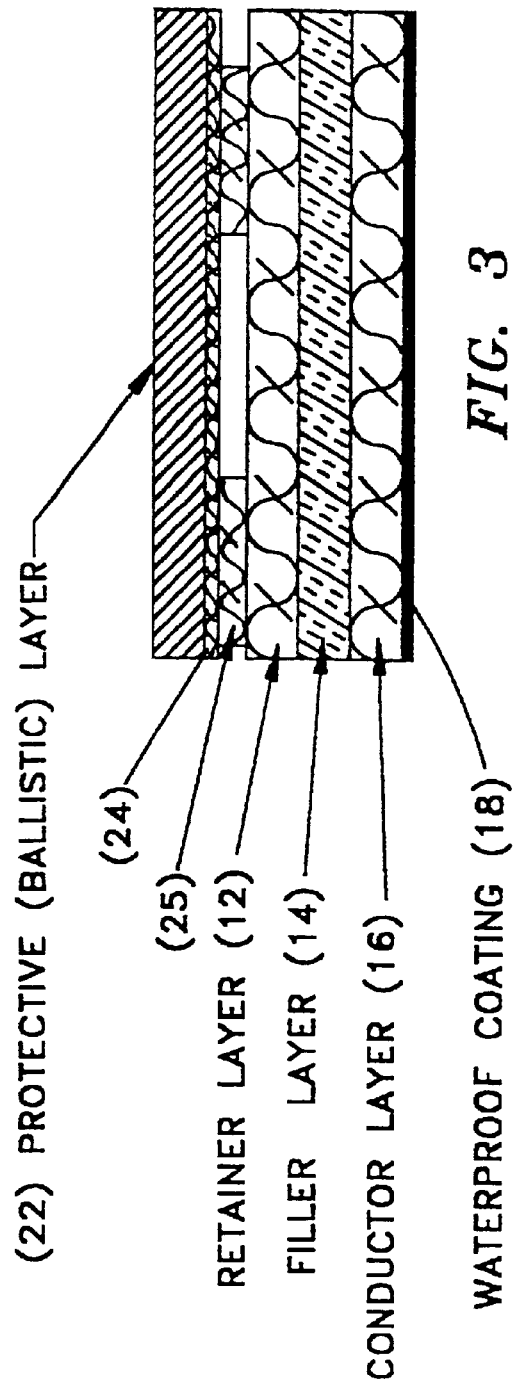
FIG. 3: a sectional elevation of the composite of FIG. 1 wherein a ballistic layer is included as a part thereof.

The composite illustrated in FIG. 3 by way of example includes an optional protective ballistic layer 22. This discrete layer is utilized for applications wherein it is anticipated that the user be subjected to gun fire or extreme impacts such as may be experienced by riot police. Typically, the ballistic layer 22 may be formed using a CORDURA-type fabric over a KELVER-type material. This layer is characteristically quite stiff and as such requires special attachment procedures that will be discussed in detail hereinafter. While the ballistic layer may be attached in many suitable ways, FIGS. 3, 7, 8, and 10–12 illustrate the use of VELCRO-type hook and loop style fasteners 25. Use of such removable type fasteners permits the temporary attachment of segmented protective layers of ballistic material to other layers of composite garments, such as jackets, in a manner which will also be discussed in greater detail hereinafter.

Figure 4:
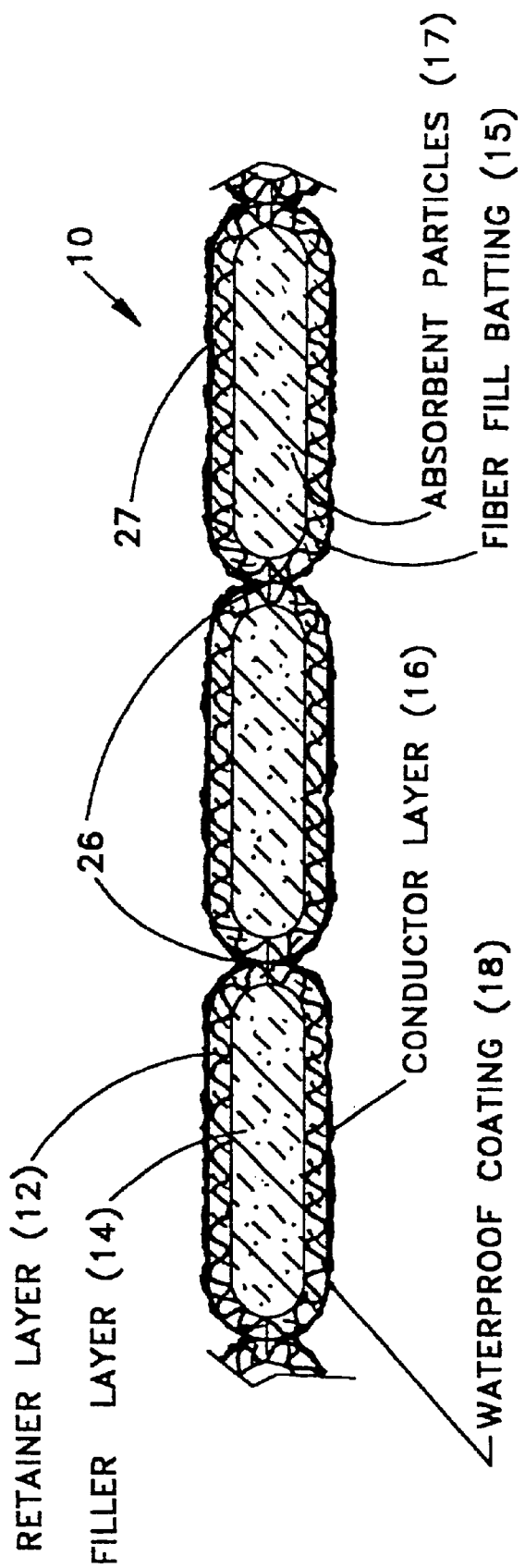
FIG. 4: a sectional view of a composite prior to soaking wherein the layers thereof have been attached to one another so as to form quilted pockets.
Figure 5:
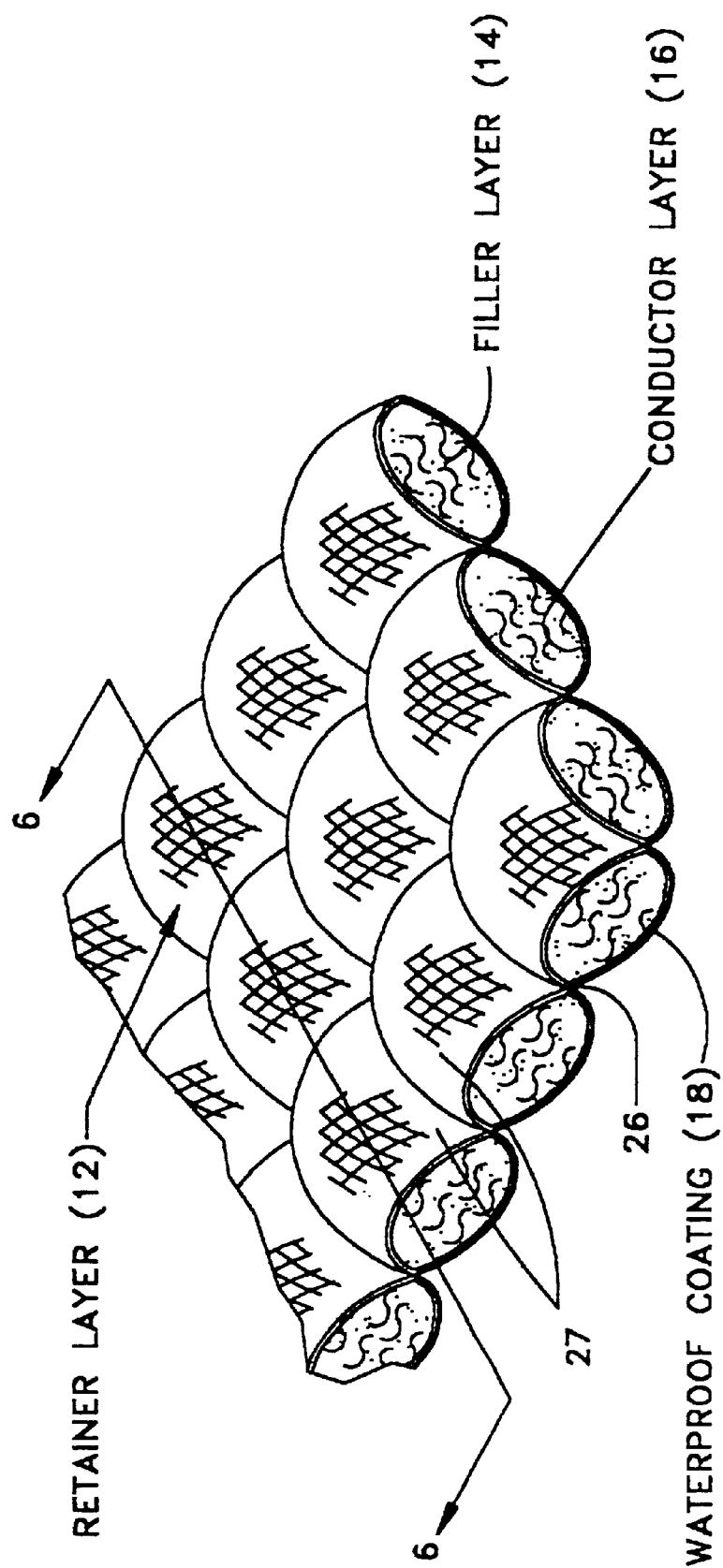
FIG. 5: a perspective view of a composite wherein the layers thereof have been attached to one another so as to form quilted pockets and wherein the pockets are illustrated in an expanded condition as a result of soaking the composite.
Figure 6:
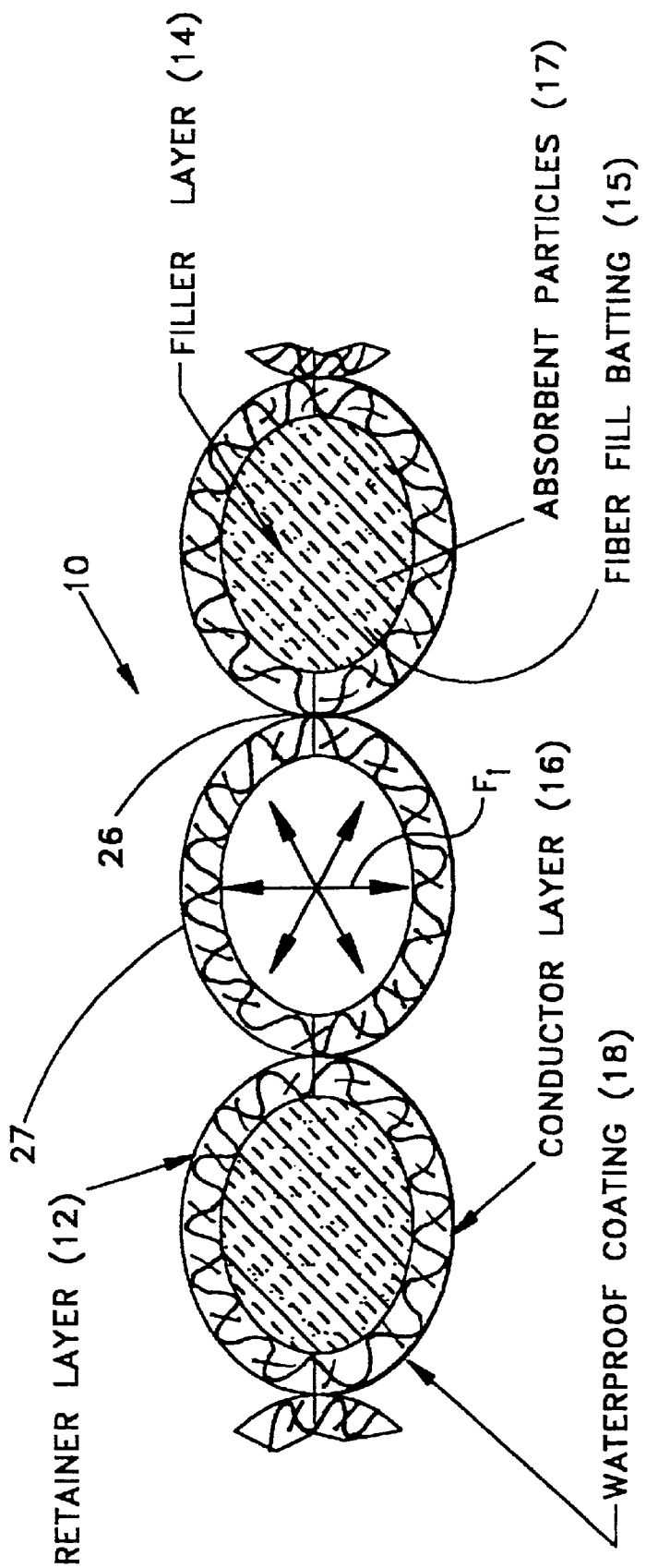
FIG. 6: a sectional view taken along line 6—6 of FIG. 8, wherein, for illustration purposes only, the filler layer has been omitted from the interior of one pocket to permit inclusion of arrows Fi which signify an internal pressure being exerted by the filler layer outwardly against the retainer layer and the conductor layer.

The composites such as illustrated in FIGS. 1 and 2 are stitched to provide seams 26 in a crossing pattern to form a quilted configuration such as illustrated in FIGS. 4 and 5. As illustrated, the crossing seams 26 form closed pockets 27. It will be noted that the pockets 37, illustrated in FIG. 4, have yet to be soaked in liquid. In this dry condition the particles 17 are very tiny (1–2 cubic millimeters) and thus occupy an insignificant amount of space within the pockets 27. Accordingly, the retainer and conductor layers, 12 and 18, respectively, lie substantially flat and experience no internal pressure from the dry particles 17. However, as noted supra, soaking the particles in liquid increases the size of the particles several hundred times. Accordingly, FIGS. 5–11 illustrate the pockets after an appropriate soaking has been accomplished. As illustrated in these figures, after soaking, the absorbent particles have expanded the pockets to the extent that, as illustrated in FIG. 6, an internal pressure, Fi, is exerted against the retainer and conductive layers 12 and 16, respectively.

In a soaked condition, a garment fabricated from a multi-layered composite as described provides an extremely effective body protection against intense heat. This protection is provided in multiple ways. First, the retainer layer of the composite may be provided with a heat resistant coating, the function of which is obvious by definition. Second, the liquid (typically water) contained by the hydrated particles and/or fibers or combinations thereof within the filler layer provide an effective thermal insulator between the retainer layer and the thermally conductive layer adjacent a person's body. Third, as the retainer layer is exposed to heat the liquid within the filler layer begins to vaporize and pass slowly through the retainer layer, thus creating a moist film on the outer surface of tie retainer layer. The moisture itself resists the heat and protects the outer surface of the retainer layer. Fourth, as the moisture on the retainer layer evaporates, an evaporative cooling occurs which further cools the retainer layer. (It will be readily understood that liquid stored within the filler layer will provide a continuation of these cooling processes). Fifth, if the user is perspiring, the perspiration will, to a large extent, evaporate and cool the user. The moisture is then carried in the form of humid air through the breathable conductive layer and into the filler layer for absorption by the partially saturated absorbent particles or fibers. To facilitate this effect, it will be noted that in certain applications the particles are not totally saturated during the soaking process, and that the conductive layer is by design an effective thermal conductor. The conductive layer is also preferably waterproof, yet porous enough to be breathable.

As stated above, one material suitable for use in the conductive layer is a NOMEX-type material (NOMEX™ being available from the DuPont Corporation). One example of a coating material may be a BREATHE TEX-type material which provides a breathable but waterproof covering that is an excellent thermal conductor and presents a cool dry surface to the body of the wearer. BREATHE-TEX™ itself is available from Alden Iudustries Inc.

One example of a batting material suitable for the filler layer is an ARAMID-E 89-type material, with the material itself being available from DuPont.

One material suitable for particles impregnated within the filler material is a cross-linked polyacrylamide polymer available from Plant Health Care Inc. As stated, another material may be a LANSEAL-F-type material, a fibrous hydrophilic polymer that may be blended with other fiberfill or batting materials and fibers.

One material suitable for use in a retainer layer is a high grade of cotton. If fire protection without a discrete protective layer is desired, cotton-fire resistant (cotton-FR) may be used. This is a cotton fabric that has been sprayed with a fire retardant.

One material suitable for use in as a fire protective layer is a NOMEX-type material, which, as stated above, is available from the DuPont corporation.

One material suitable for use in an impact protective layer such as would be utilized by persons subjected to gunfire is a CORDURA-type material and a KEVLAR-type material, both of which being available from DuPont.

FIG. 6 is a sectional is a sectional view taken along section line 6—6 of FIG. 5. For purpose of illustration, the filler layer has been omitted from one pocket 27. Arrows, Fi, are included within the pocket to illustrate the fact that, after an appropriate soaking, an outward pressure is exerted upon the inner walls of both the retainer and conductor layers 12 and 16, respectively, by the absorbent saturated particles 17. To determine an appropriate soaking time, the size and number of the absorbent particles must be predetermined. Parameters such as the pocket size required to provide a predetermined positive pressure within the pockets after the composite has been soaked must also be considered. The required internal pressure, Fi, is dependent upon the intended application of the composite.

Figure 7:
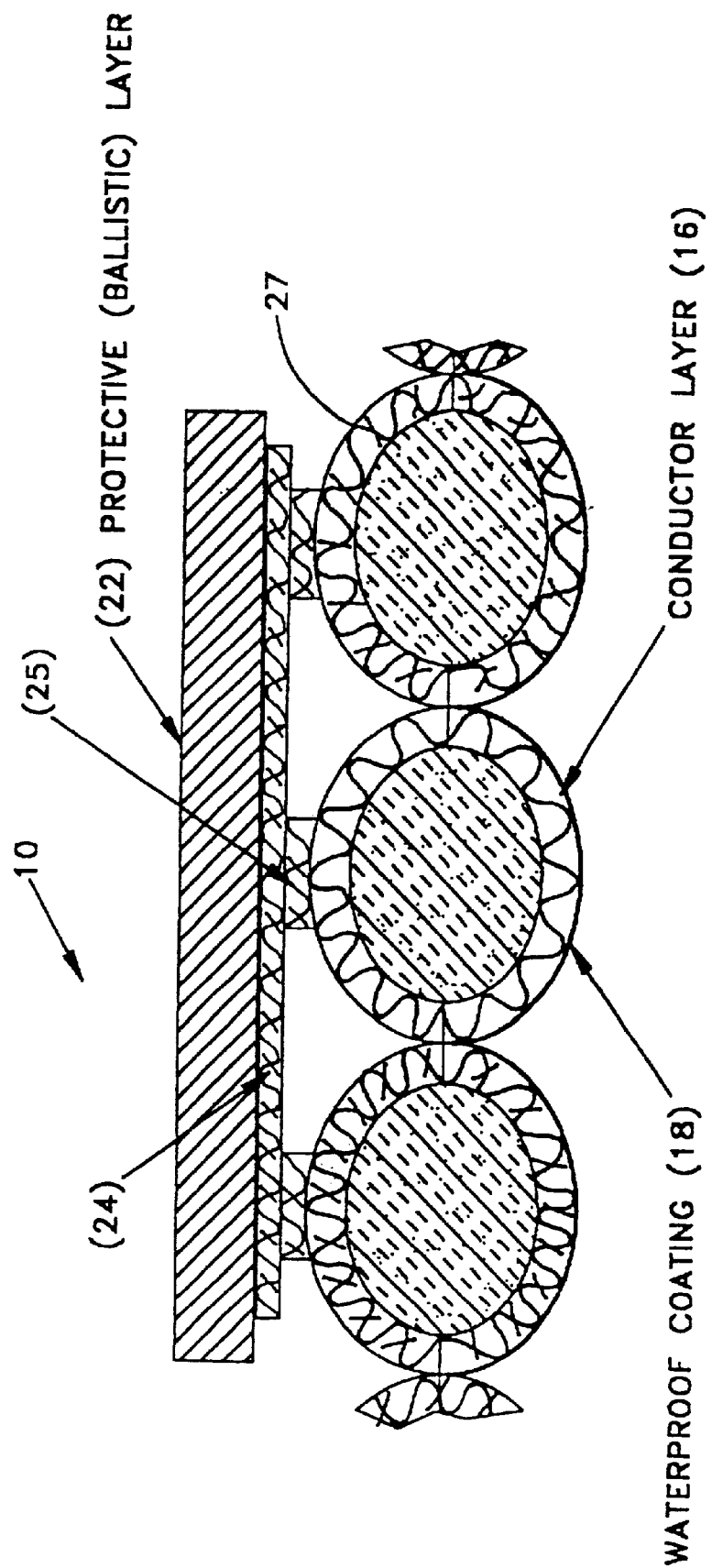
FIG. 7: a sectional view as in FIG. 6, wherein the quilted pockets are attached to a ballistic layer.

Referring now to FIG. 7, the ballistic layer 22 is illistrated as being attached to the outermost portions of pockets 27 by individual patches 25 of a VELCRO-type hook-and-loop material. A sheet 24 of either the hook portion or the loop portion of the hook-and-loop material may be attached to the inner surface of the ballistic layer 22. This arrangement permits placement and attachment of the ballistic layer 22 in any desired position upon the retainer layer 12.

Figure 8:
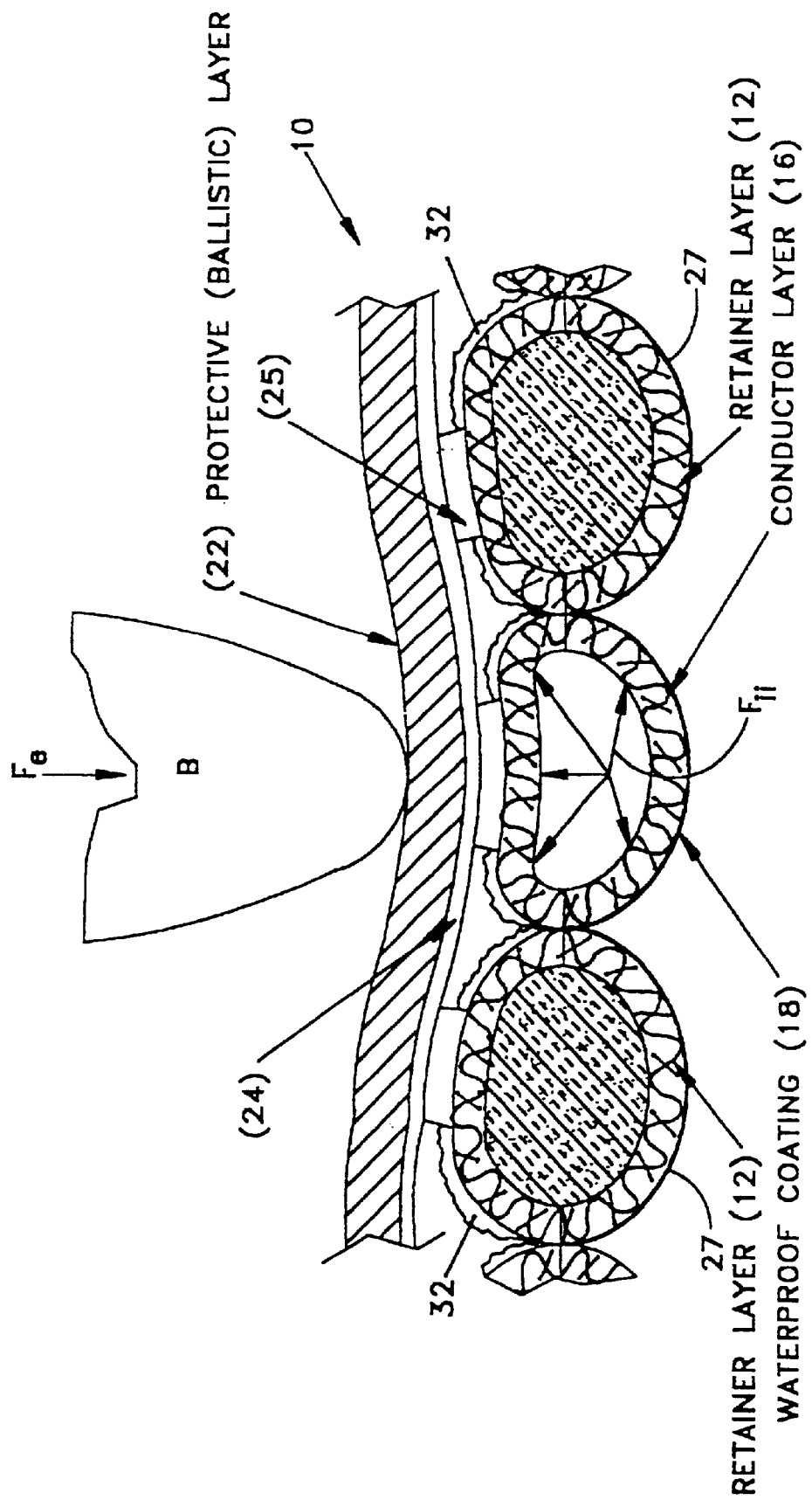
FIG. 8: a sectional view as in FIG. 7 that illustrates a deformation of the quilted pockets as caused by the impact of a bullet upon a ballistic layer and also, by arrows Fii, illustrates the increase of pressure within the pockets as a result of the impact from the bullet, and the resultant expulsion of material through the retainer layer of the composite.
Figure 9:
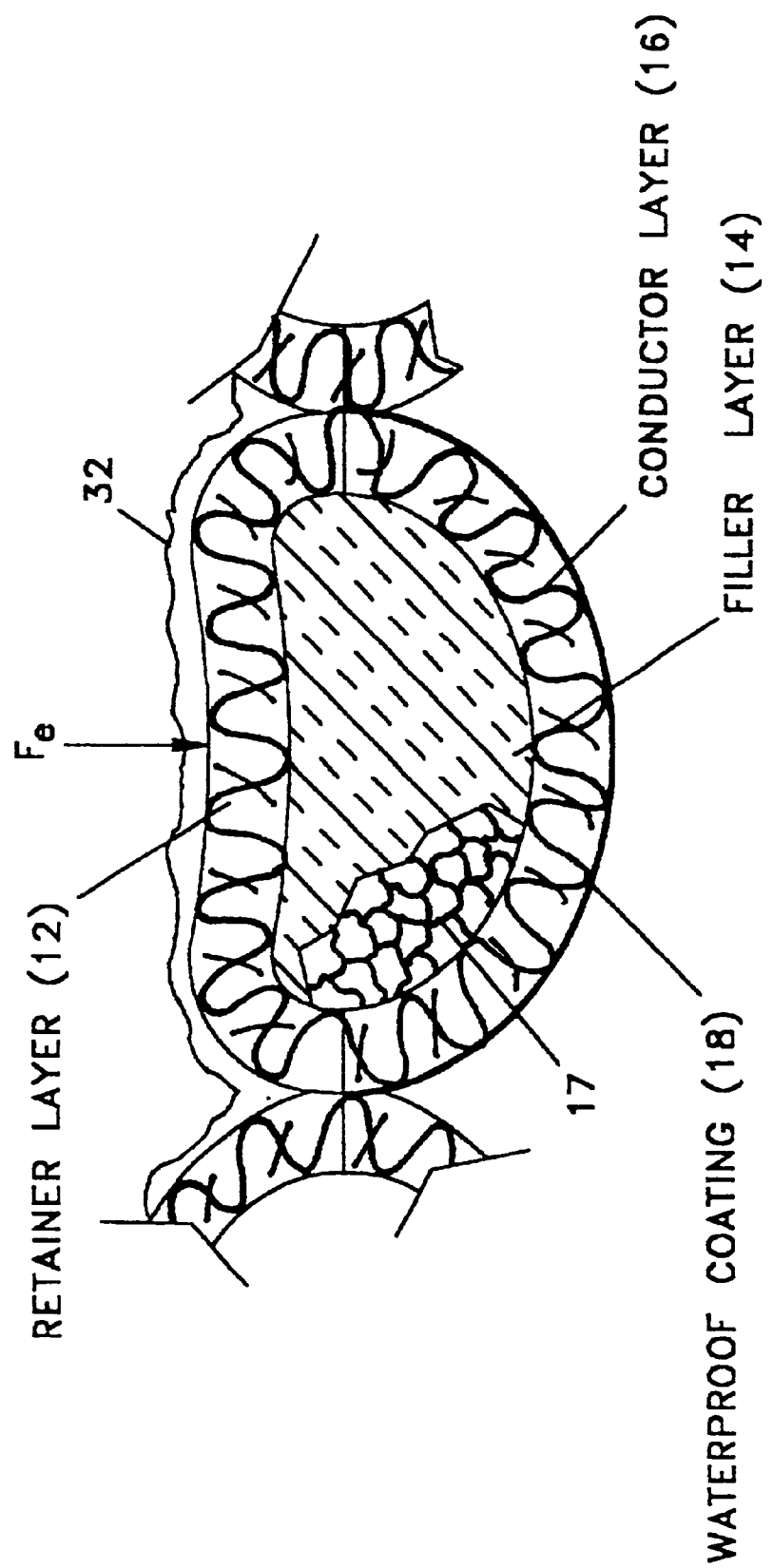
FIG. 9: an enlarged sectional view of a pocket having been deformed to the extent that polymer material from the filler layer have been forced outwardly through the retainer layer.

Referring now to FIG. 8, the ballistic layer 22 is illustrated as having been impacted by a high velocity object, such as a bullet, B. It will be noted that, because of the stiffness of the ballistic layer, the impact of the bullet, B, has been spread over a relatively large area which encompasses a proportionally large number of pockets 27. It will be noted that the impact causes considerable deformation and compression of the affected pockets. As the volume of the impacted pockets decreases, the pressure within the pockets will increase rapidly, as illustrated by the force arrows, Fii, in FIG. 8. Since the liquid within the polymer particles is incompressible, it is apparent that if the pressures within the pockets are not relieved to some extent, the pockets will burst under the severe stresses caused by impact of the bullet.

Because of the characteristics of the polymers from which these particles 17 are formed, effective removal of the water from the polymer can only be accomplished by means of evaporation. After soaking, polymer particles 17 are transformed from tiny solid particles to a much-enlarged gelatin-like mass (see 17, FIG. 9).

An attempt to squeeze the water from the enlarged particles by compression of the particles may result in a breakdown of the structural integrity of the particles into smaller pieces which continue to retain the absorbed water. As mentioned previously, this characteristic of the polymer provides an extremely effective medium for use as a shock absorbing substance. As stated, water by itself is considered to be incompressible. Water and many other liquids are used for shock absorbing purposes by encapsulation in a container which is sealed except for a small opening which permits, its expulsion wider a controlled rate. To use water, per se, in a garment having numerous individual containers (pockets) would obviously be impractical. However, by holding the water within a hydrophilic polymer as described, the properties of water when combined with the polymer provide an effective shock-absorbing medium. Use of the saturated or partially saturated polymer as a shock absorbing medium is accomplished by encapsulation of a predetermined amount of water saturated polymer particles, fibers, or blends thereof, within a fabric pocket of a predetermined size. By controlling the amount of polymer in proportion to the size of the pocket, a positive pressure will be exerted upon the inner surfaces of the pocket by the expanding polymer particles as they are exposed to water. Thus, it will be readily understood that application of an external compression of the pocket such as would be caused by an impact to the pocket, will deform and decrease the volume of the pocket.

An increase of internal pressure results as the volume of the pocket is reduced. If the polymer were to be totally saturated and assuming the fabric to be waterproof, it will be understood that the incompressibility of the water within the polymer particles would cause the pocket to rupture if the force became too great. While a small amount of energy would be absorbed during this process, the abrupt rupture of the pocket would cause immediate loss of resistance to the impact. To prevent such a rupture, a portion of the fabric of the pocket is fabricated of a material having a porosity which will permit expulsion of gelatinous masses of the saturated polymer particles 17 through the pores of the fabric 15 at a controlled rate (see FIG. 9). The rate of expulsion is dependent upon the porosity of the material. The expulsion will prevent rupture of the pocket and thus provide an effective means of absorbing the energy created by the impact on the pocket. The expulsion of the saturated polymer is more clearly illustrated in FIG. 8 and enlarged to FIG. 9, wherein expelled polymer is identified by the numeral 32. As should be apparent, the application of energy from an impact will be more effectively absorbed if the force of the impact is distributed over a number of pockets.

The user of the multi-layered composite material, whether it be in the form of garment, a blanket, or whatever the item, is thus provided with effective protection against impact injuries. As the danger of extreme impacts is increased, such as with police engaged in riot control or other hazardous duties, layers of more rigid materials may be utilized to provide a means to distribute the energy of an impact to the largest possible number of pressurized pockets. As compared to the use of a ballistic garment alone, a composite garment including a ballistic layer has been proven to reduce the impact on the wearer's body by about 20% when struck by a gunshot.

Tests of this composite in garments for use by firemen, policemen and military personnel have been truly outstanding. These garments are readily adaptable to meet the requirements of the variety of applications mentioned above.

For example, to use a garment made from the basic multi-layered composite by a fireman, the retainer layer may simply be sprayed with a fire retardant coating. If required, an additional discrete layer of fire retardant material may be easily added.

Thus, after soaking a garment as described above, the multi-layered composite provides an extremely effective protection to the wearer not only against extreme heat but also against injury from falling debris as may be encountered by firemen within a burning building.

Figure 10:
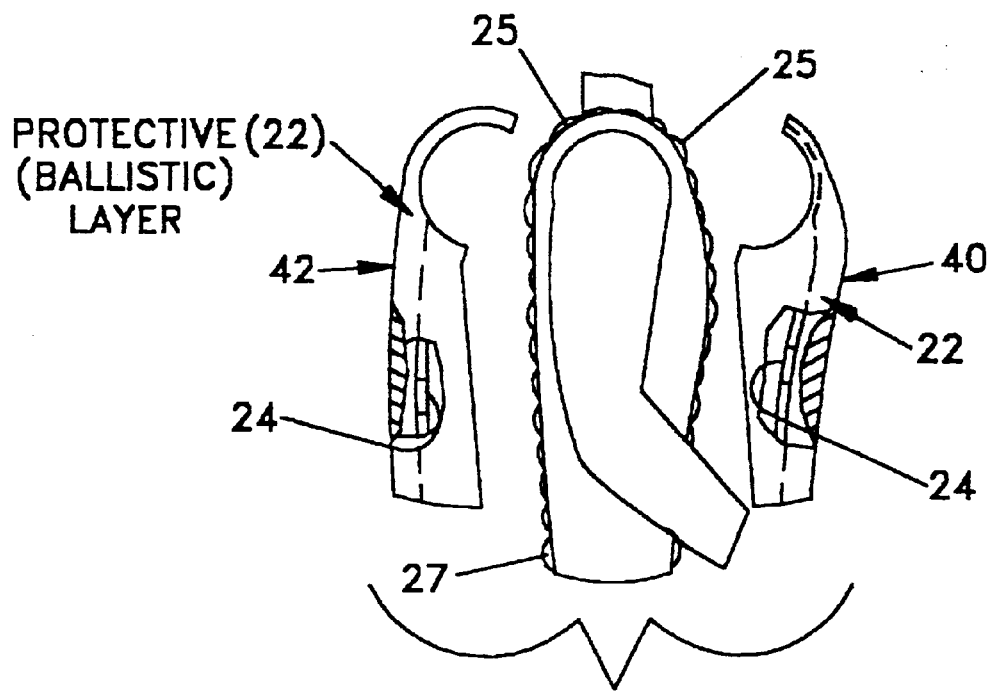
FIG. 10: a composite garment illustrating a chest and back protective layer for temporary attachment to a retainer layer to provide personal protection against projectiles such as bullets.
Figure 11:
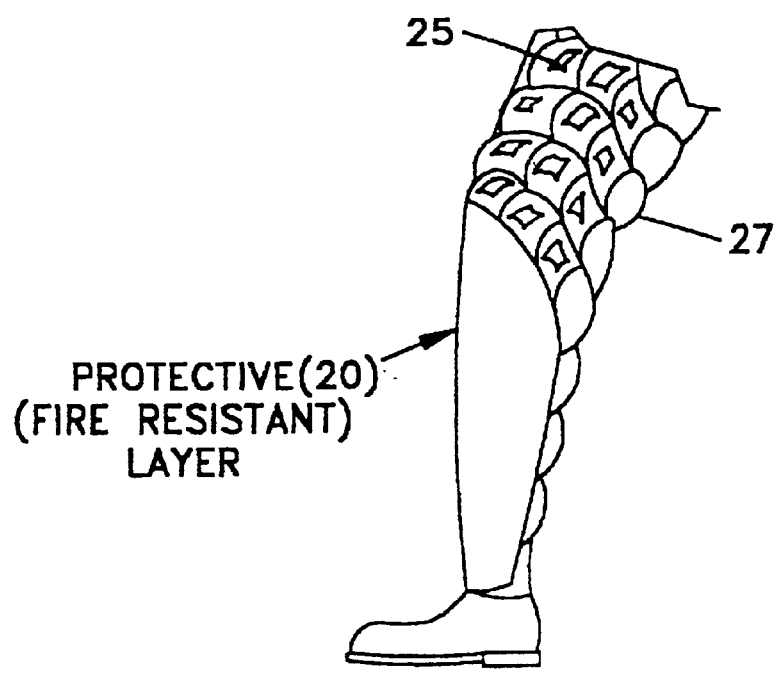
FIG. 11: a protective layer in the form of a shin guard that is attached to a retainer layer of a composite garment.
Figure 12:
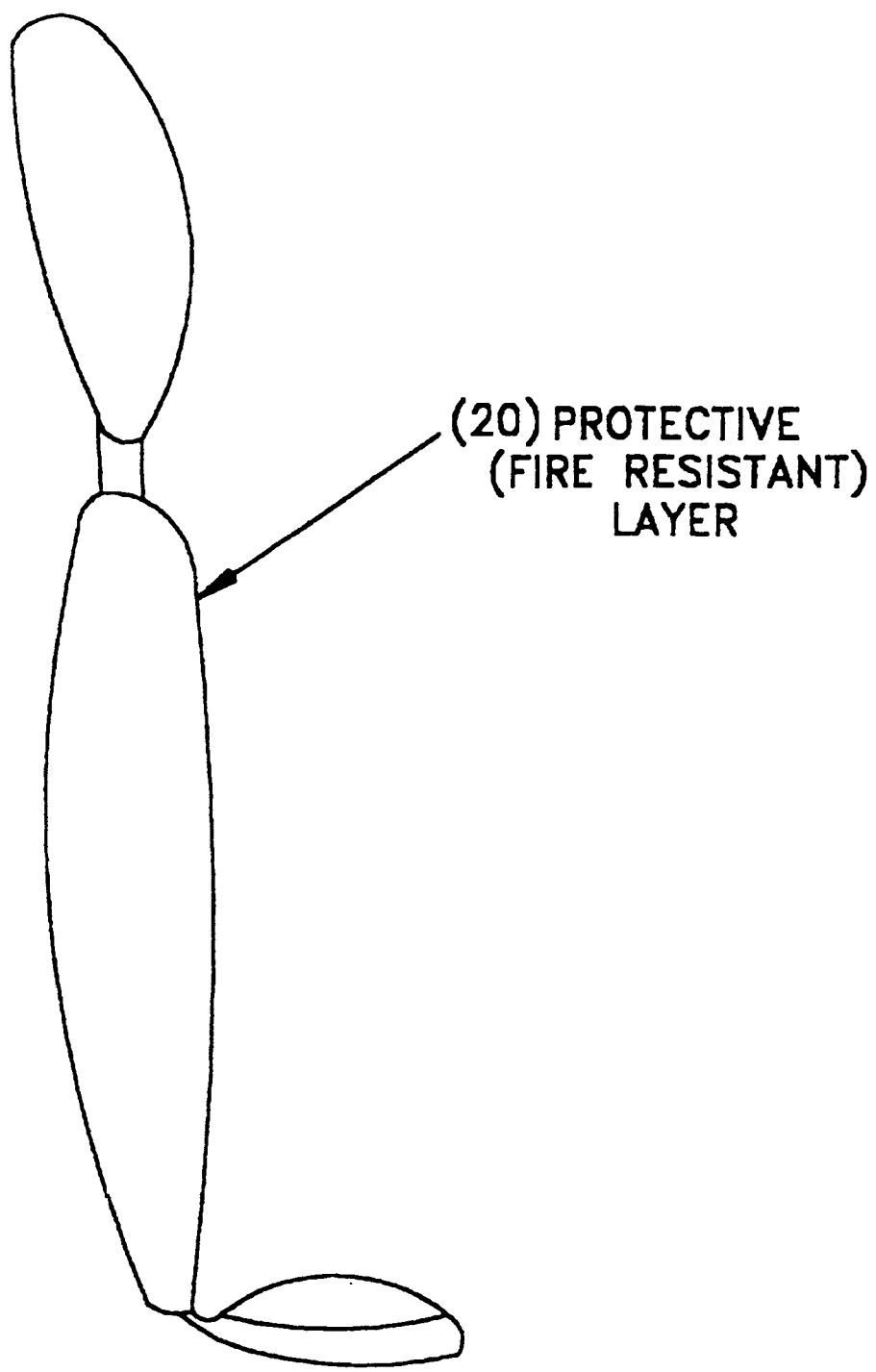
FIG. 12: a protective layer of a composite wherein a layer is adapted for temporary attachment to the remainder of the composite, for protection of the forward portion of the leg and foot of a person.

In use, any item fabricated from the composite material of the various embodiments of the present invention is soaked in a liquid, such as water, for a predetermined time. While a typical soaking period may be about 2 to 5 minutes, many parameters must be considered in arriving at an optimum soaking period. These parameters include the make up of the composite, as well as its intended application. For example, in applications intended primarily for protection against severe impact, time sufficient to soak the polymer particles, fibers, or blends thereof to near 100% saturation may be required. If the application is one requiring protection from intense heat, time sufficient to achieve 50% to 90% saturation may be appropriate. It is pointed out that the degree of saturation is measured experimentally and is converted to a soaking time and/or soaking method. In use, such information is provide with each composite item. More specifically, in an impact protection application, a greater number of particles would be soaked for a longer time so as to exert a greater pressure within each pocket of the composite. It also follows that, within the constraints imposed by the pockets, the greater the expected impact, the higher the original pressure within the pockets should be. As pointed out supra, for protection against severe impact from bullets and the like, the composite includes a protective layer of ballistic material. This protective layer may be permanently or temporarily attached to the retainer layer. Permanent attachment may be made by sewing, bonding or other suitable moans and may typically be done prior to the quilting process. Temporary attachment of the protective layer may be accomplished after completion of the quilting process through the use of a hook-and-loop material as described. In this manner the protective layer may be temporarily attached to the retainer layer without the need for alignment of the mating hook-and-loop materials. This temporary fastening arrangement permits the attachment or removal of a selected protective layer to whatever area of the users body may require protection. Thus the user may be clothed in a complete suit of quilted composite without a protective layer. Then any selected configuration of the protective layer may be quickly attached. As illustrated in FIG. 10, a police officer requiring protection from gunfire may be provided with a fitted chest and/or back protection layer (numerals 40 and 42, respectively). As illustrated in FIGS. 11 and 12, a fireman fighting a forest fire may be provided with an additional protective layer to the legs for protection against injury from movement through heavy and often thorny underbrush, as well as from the intense heat of the fire.

While the equipment illustrated in FIG. 10 typically would be used in lieu of existing equipment, it may also be worn under existing fire fighting equipment. As is well known, those fighting forest fires are in serious jeopardy from backfires, which can close any means of escaping the flames. In this situation, the survival practice is to lie in a quickly prepared trench, to cover one's body with a blanket and allow the fire to pass over. The use of a soaked blanket fabricated from a composite material as described herein provides unequaled protection for this purpose. As pointed out supra, the use of such blankets for protection of bedridden persons is also contemplated.

As stated above, with respect to an application requiring protection from Intense heat, a saturation of 50% to 90% may be appropriate so as to provide a means of absorbing the perspiration of the user. If the user is perspiring the perspiration will to a large extent evaporate thus cooling the user. The moisture will then be carried in the form of humid air through the breathable conductive layer and into the filler layer for absorption by the partially saturated particles. Other cooling functions of the composite are also described hereinabove.

Thus, it is understood that various embodiments of the present invention are disclosed which achieve the objectives of the invention as set forth above. However, it should be appreciated that this invention may be implemented in ways other than those disclosed. Variations may also be made with respect to the best mode of practicing this invention without departing from the scope of the invention as set forth in the following appended claims, wherein we claim.

We claim:

1. A method of cooling a person by evaporation, comprising:

providing a multi-layered, liquid-retaining composite material comprising a fiberfill batting material, and hydrophilic polymeric fibers that absorb at least about 2.5 times the fiber's weight in water;

soaking said multi-layered composite in a liquid;

employing said multi-layered, liquid-retaining composite material as a garment or a flat sheet and evaporatively cooling said person.

2. The method of claim 1, wherein said garment is a shirt, vest, pant, or jacket.

3. The method of claim 1, wherein said soaking occurs for a period of 2 to 5 minutes.

4. The method of claim 1, wherein said fibers are composed of not less than 90 weight percent of acrylonitrile and less than ten weight percent of a water-absorbing resin containing carboxyl groups; and have a degree of swellability of 10–300 cc/g.

5. The method of claim 4, wherein said water-absorbing resin has a particle diameter of not larger than 0.5 microns at absolute dryness and is insoluble in water.

6. The method of claim 1, wherein said hydrophilic polymeric fibers have an inner layer and an outer layer and said hydrophilic polymeric fibers are composed of not less than 90 weight percent of an acrylonitrile polymer and having disbursed therein less than ten weight percent of water-absorbing resin particles containing at least one carboxyl group represented by —COOX, wherein X is H, $NH_4$ or an alkali metal.

7. The method of claim 1, wherein said hydrophilic polymeric fibers are blended with said fiberfill in a range of from about 15 percent to 75 percent with the fiberfill.

8. The method of claim 1, wherein the multi-layered liquid-retaining composite further comprises a conductive layer and a retainer layer, both of which communicate with the fiberfill batting material.

9. A method of cooling a person by evaporation, comprising:

providing a multi-layered, liquid-retaining composite material comprising:
a filler layer comprising:
a fiberfill batting material and
hydrophilic polymeric particles;

soaking said multi-layered, liquid-retaining composite in a liquid; and employing said multi-layered, liquid-retaining composite as a garment or a flat sheet and evaporatively cooling said person.

10. The method of claim 9, wherein said hydrophilic particles are capable of expanding 100 to 300 times from their original dry size to a wet size responsive to being soaked in liquid.

11. The method of claim 9, wherein said hydrophilic particles have a volume when dry of between 0.1 to 2 cubic millimeters.

12. The method of claim 9, wherein the fiberfill batting material comprises at least one of a woven aramid fiber or a polybenzamidazole fiber.

13. The method of claim 12, wherein the multi-layered liquid-retaining composite further comprises a conductive layer and a retainer layer, both of which communicate with the fiberfill batting material.

14. The method of claim 9, wherein the multi-layered liquid-retaining composite further comprises a conductive layer and a retainer layer, both of which communicate with the fiberfill batting material.

15. A method of cooling a person, comprising:

providing a multi-layered, liquid-retaining composite material comprising:

a filler layer comprising:
   a fiberfill batting material and
   hydrophilic polymeric particles capable of expanding 100 to 300 times from their original dry size to a wet size responsive to being soaked in liquid;
soaking said multi-layered, liquid-retaining composite in a liquid; and
employing said multi-layered, liquid-retaining composite as a garment or a flat sheet.

16. The method of claim 15, wherein said hydrophilic particles have a volume when dry of between 0.1 to 2 cubic millimeters.

17. The method of claim 15, wherein the fiberfill batting material comprises at least one of a woven aramid fiber or a polybenzamidazole fiber.

18. The method of claim 15, wherein said filler layer further comprises:
   hydrophilic polymeric fibers that absorb at least 2.5 times the fibers weight in water.

19. The method of claim 18, wherein said hydrophilic polymeric fibers are polyacrylonitrile/polyacrylate fibers.

20. The method of claim 18, wherein said hydrophilic polymeric fibers have diameters ranging from about 10 to 50 microns and lengths ranging from about 3 to 60 millimeters.

21. The method of claim 18, wherein said fibers are comprised of absorbent gelling material and said fibers are bi-component fibers.

22. The method of claim 18, wherein said fibers are bi-component fibers of the sheath/core type.

23. The method of claim 15, wherein the multi-layered liquid-retaining composite further comprises a conductive layer and a retainer layer, both of which communicate with the fiberfill batting material.

24. A method of cooling a mammal by evaporation, comprising:
   providing a multi-layered, liquid-retaining composite material comprising a fiberfill batting material, and hydrophilic polymeric fibers that absorb at least about 2.5 times the fiber's weight in water;
   soaking said multi-layered composite in a liquid;
   employing said multi-layered, liquid-retaining composite material as a garment or a flat sheet and evaporatively cooling said mammal.

25. The method of claim 24, wherein said garment is a shirt, vest, pant, or jacket.

26. The method of claim 24, wherein said soaking occurs for a period of 2 to 5 minutes.

27. The method of claim 26, wherein said fibers are composed of not less than 90 weight percent of acrylonitrile and less than ten weight percent of a water-absorbing resin containing carboxyl groups; and
   have a degree of swellability of 10–300 cc/g.

28. The method of claim 27, wherein said water-absorbing resin has a particle diameter of not larger than 0.5 microns at absolute dryness and is insoluble in water.

29. The method of claim 26, wherein said hydrophilic polymeric fibers have an inner layer and an outer layer and said hydrophilic polymeric fibers are composed of not less than 90 weight percent of an acrylonitrile polymer and having disbursed therein less than ten weight percent of water-absorbing resin particles containing at least one carboxyl group represented by —COOX, wherein X is H, $NH_4$ or an alkali metal.

30. The method of claim 26, wherein said hydrophilic polymeric fibers are blended with said fiberfill in a range of from about 15 percent to 75 percent with the fiberfill.

31. A method of cooling a mammal by evaporation, comprising:
   providing a multi-layered, liquid-retaining composite material comprising:
      a filler layer comprising:
         a fiberfill batting material and
         hydrophilic polymeric particles;
   soaking said multi-layered, liquid-retaining composite in a liquid; and
   employing said multi-layered, liquid-retaining composite as a garment or a flat sheet and evaporatively cooling said mammal.

32. The method of claim 31, wherein said hydrophilic particles are capable of expanding 100 to 300 times from their original dry size to a wet size responsive to being soaked in liquid.

33. The method of claim 31, wherein said hydrophilic particles have a volume when dry of between 0.1 to 2 cubic millimeters.

34. The method of claim 31, wherein the fiberfill batting material comprises at least one of a woven aramid fiber or a polybenzamidazole fiber.

35. The method of claim 8, wherein the conductive layer is provided with a coating that is impervious to liquids, while allowing free passage of gases therethrough.

* * * * *

(12) EX PARTE REEXAMINATION CERTIFICATE (10343rd)
United States Patent
Bumbarger et al.

(10) Number: US 6,371,977 C1
(45) Certificate Issued: Oct. 20, 2014

(54) PROTECTIVE MULTI-LAYERED LIQUID RETAINING COMPOSITE

(75) Inventors: Scott A. Bumbarger, Decatur, AL (US); Thomas H. Bumbarger, Decatur, AL (US)

(73) Assignee: Techniche Solutions, Vista, CA (US)

Reexamination Request:
No. 90/012,604, Sep. 14, 2012

Reexamination Certificate for:
Patent No.: 6,371,977
Issued: Apr. 16, 2002
Appl. No.: 09/408,861
Filed: Sep. 30, 1999

Related U.S. Application Data

(63) Continuation-in-part of application No. 09/275,194, filed on Mar. 23, 1999, now abandoned, which is a continuation-in-part of application No. 08/947,184, filed on Oct. 8, 1997, now Pat. No. 5,885,912.

(51) Int. Cl.
*A61F 7/00* (2006.01)
*A41D 1/04* (2006.01)

(52) U.S. Cl.
USPC ............. 607/108; 607/112; 607/96; 2/102; 428/372

(58) Field of Classification Search
None
See application file for complete search history.

(56) References Cited

To view the complete listing of prior art documents cited during the proceeding for Reexamination Control Number 90/012,604, please refer to the USPTO's public Patent Application Information Retrieval (PAIR) system under the Display References tab.

*Primary Examiner* — Glenn K Dawson

(57) ABSTRACT

A multi-layered composite comprising a protective layer, a retaining layer, a conductive layer and a filler layer intermediate the retainer and conductive layers. The filler layer is impregnated with liquid absorbent particles and/or fibers. An optional protective layer having specific characteristic for protection against extreme temperatures, physical impacts and the like is specifically disclosed for use in combination with the retainer, filler and conductive layers. The protective layer provides additional protection of the person from catastrophic events such as exposure of a person to fire and/or severe impact such as may be caused by gunfire.

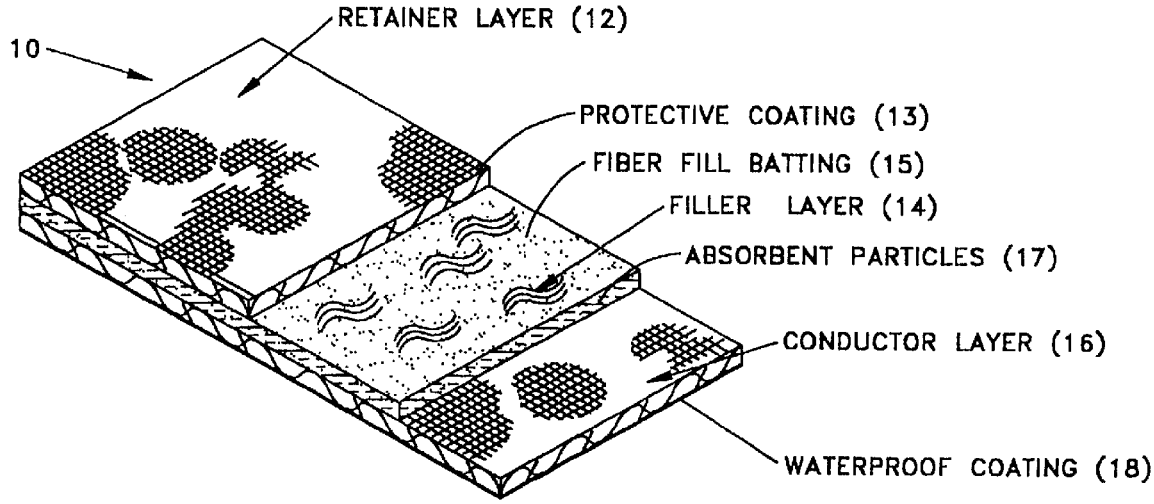

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-3, 8, 19 and 24-26 is confirmed.

Claims 9, 10, 14, 15, 18, 23, 31 and 32 are cancelled.

Claims 4-7, 11-13, 16, 17, 20-22, 27-30 and 33-35 were not reexamined.

* * * * *